(12) United States Patent
Mangalam et al.

(10) Patent No.: US 8,463,635 B1
(45) Date of Patent: Jun. 11, 2013

(54) SYSTEM AND METHOD FOR MAINTAINING, INSPECTING AND ASSESSING THE RELIABILITY OF ELEVATOR AND OTHER PEOPLE MOVING DEVICES

(75) Inventors: Srikanth Mangalam, Mississauga (CA); Lency Abraham Mulamootil, Mississauga (CA); Muddassir Nazir, St. John's (CA)

(73) Assignee: Technical Standards and Safety Authority, Toronto, Ontario ( * ) Notice: Subject to any disclaimer, the term of this patent is extended or adjusted under 35 U.S.C. 154(b) by 0 days.

(21) Appl. No.: 13/309,707

(22) Filed: Dec. 2, 2011

(51) Int. Cl.
*G06Q 10/00* (2012.01)
*G01B 3/52* (2006.01)
*G04F 10/06* (2006.01)
*G06F 7/74* (2006.01)
*G06F 7/64* (2006.01)

(52) U.S. Cl.
USPC ............. 705/7.12; 702/177; 702/35; 703/2

(58) Field of Classification Search
USPC ...................................... 705/1–44
See application file for complete search history.

(56) References Cited

U.S. PATENT DOCUMENTS 7,840,376 B2 * 11/2010 Torng ..................... 702/177

OTHER PUBLICATIONS

Sueng-Tae Park, An Implementation of Risk Based Inspection for Elevator Maintenance, 2010, Journal of Mechanical Science and Technology, 24, 2367-2376.*
Mangalam, Feo, Risk Informed Decision Making by a Public Safety Regulatory Authority in Canada: A Case Study Involving Risk Based Scheduling of Periodic Inspections, 2006, Technical Standards and Safety Authority, WM'06 Conference, 1-8.*

* cited by examiner

*Primary Examiner* — Jason B. Dunham
*Assistant Examiner* — Zahra Elkassabgi
(74) *Attorney, Agent, or Firm* — McMillan LLP (57) ABSTRACT

An elevator device having a computer system associated therewith for determining a risk of failure in the elevator device and for determining an inspection schedule to mitigate the risk. The computer system includes a module for determining an acceptable risk score, a module for determining an inspection schedule based on said risk score, a module for determining an increase in risk score proportional to a time elapsed since an expected inspection in the inspection schedule if the expected inspection has been missed, a module for determining a tolerance within the inspection schedule based on the increased risk, and a module for specifying an inspection schedule and an inspection tolerance based on the determined schedule and the determined tolerance.

18 Claims, 7 Drawing Sheets

SYSTEM AND METHOD FOR MAINTAINING, INSPECTING AND ASSESSING THE RELIABILITY OF ELEVATOR AND OTHER PEOPLE MOVING DEVICES

FIELD OF THE INVENTION

The present invention relates generally to the field of people moving devices, particularly elevating devices, and more specifically to a system and method for inspecting and maintaining elevating devices and for providing adaptive inspections for such devices.

BACKGROUND OF THE INVENTION

Periodic inspections of elevator and other people moving devices are essential to ensure safe operations in these devices. Both minor and catastrophic failures in elevating devices can lead to significant short term human injury and/or chronic long term injuries that present significant public safety risks. This is particularly true in elevating devices that are designed to move a volume of people at a given time. Accordingly, various governmental quasi-governmental, and similar agencies have been put in place to ensure the proper operation, maintenance and inspection of elevating devices. With regards to inspections, prior art methods generally operate on a mandated inspection schedule. When these inspections are missed, or are late, whether due to a shortage of inspection personnel, physical limitations or other unaccounted for circumstances, prior art systems have been unable to adapt accordingly.

Furthermore, the prior art has been unable to handle the case of missed or delayed inspections and/or maintenance operations other than on an ad hoc basis, or otherwise rushing to complete a delayed inspection and/or maintenance as soon as possible. In an era of limited resources, or where such schedules are altogether unreasonable, it would be beneficial to provide an improved system and method that dynamically adapts as maintenance and/or inspections are not carried out with respect to a fixed schedule.

It is therefore an object of the invention to solve one or more of the above mentioned deficiencies of the prior art, and to provide a novel system and method for maintaining, inspecting and assessing the reliability of people moving devices.

SUMMARY OF THE INVENTION

According to one embodiment of the invention, there is provided a method for determining a risk of failure in a people moving device and for determining an inspection schedule to mitigate the risk, the method includes the steps of determining an acceptable risk score, determining an inspection schedule based on the risk score, determining an increase in risk score proportional to a time elapsed since an expected inspection in the inspection schedule if the expected inspection has been missed, determining a tolerance within the inspection schedule based on the increased risk, and, specifying an inspection schedule and an inspection tolerance based on the determined schedule and the determined tolerance.

According to one aspect of this embodiment, the step of determining an acceptable risk score comprises selecting the maximum of an operational risk score and a device incident risk score. Preferably, the operational risk score is calculated based on observed and/or measured incident occurrences of the people moving device, and wherein the device incident risk score is calculated based on historical failure data.

According to another aspect of this embodiment, the operational risk score is calculated based on the equation $R_D = f_b * D$, where $f_b$ is the frequency of incident occurrences per year; and, D is a measure of life years expected to be lost as a result of the occurrences by occurrence type. D is calculated based on equation $D = SW*SD + FL*LW*LD$; where SW is a short-term weight, SD is a short-term duration effect measured in years, FL is a fraction representative of the long-term versus short-term effects, LW is a long-term weight, and LD is a long-term duration effect measured in years.

According to another aspect of this embodiment, a device operational risk score is calculated as a summation of each of the individual operational risk scores.

According to another aspect of this embodiment, the people moving device is identified as one of a high risk device, a medium risk device and a low risk device.

According to another aspect of this embodiment, the high risk device is one where the value of D is equal to or greater than $4.5 \times 10^{-4}$; the medium risk device is one where the value of D is between $4.5 \times 10^{-4}$ and $6.7 \times 10^{-6}$ and the low risk device is one where the value of D is less than $6.7 \times 10^{-6}$.

According to another aspect of this embodiment, the method further includes the step of initiating an inspection of the people moving device if the people moving device is identified as a high risk device.

According to another aspect of this embodiment, the step of determining an inspection schedule comprises calculating an inspection schedule $t_m$ or $t_l$ based on the equations for medium and low risk devices, respectively:

$$t_M = 12 - \frac{1}{0.7} LN\left[\frac{R_M}{6.7 \times 10^{-6}}\right]$$

$$t_L = 18 - \frac{1}{1.21} LN\left[\frac{R_L}{4.713 \times 10^{-9}}\right]$$

According to another aspect of this embodiment, the step of determining an increase in risk score comprises calculating an increased risk score $R_M$ or $R_L$, based on the equations for medium and low risk devices, respectively:

$$R_M = 6.7 \times 10^{-6} \exp[0.7(12 - (t_M - od))]$$

$$R_L = 2.4 \times 10^{-6} \exp[1.322(18 - (t_L - od))]$$

where od is the time elapsed since an expected inspection.

According to another aspect of this embodiment, the method further includes the step of using the increased risk score to determine if the increased risk is a high, medium or low risk.

According to another aspect of this embodiment, the people moving device is an elevator.

According to another embodiment of the invention, there is disclosed a system for determining a risk of failure in a people moving device and for determining an inspection schedule to mitigate the risk. The system preferably includes a module for determining an acceptable risk score, a module for determining an inspection schedule based on the risk score, a module for determining an increase in risk score proportional to a time elapsed since an expected inspection in the inspection schedule if the expected inspection has been missed, a module for determining a tolerance within the inspection schedule based on the increased risk and a module for specifying an inspection schedule and an inspection tolerance based on the determined schedule and the determined tolerance.

According to various other aspects of this embodiment, the system is adapted to carry out the various method steps described above. Preferably, the people moving device is an elevator, and the system is a computer system associated with the elevator.

According to another embodiment of the invention, there is disclosed a computer readable medium having computer executable instructions thereon for carrying out the method according to the invention as herein described.

BRIEF DESCRIPTION OF THE DRAWINGS

Embodiments will now be described, by way of example only, with reference to the attached Figures, wherein.

DETAILED DESCRIPTION OF THE EMBODIMENTS

The problem associated with the inspection of people mover devices, such as elevators, has previously been addressed on a purely qualitative basis or otherwise as mandated on a fixed schedule, without due regard to physical and/or historical risks associated with particular elevating devices. The invention, accordingly provides a heuristic approach that provides solutions for complex risk aggregation problems occurring in elevating devices. In the context of this application, non-compliances found during inspections are considered hazards to the safe operation of the elevator device and are identified as basic risk elements. The proposed method and system for operational risk quantification in elevating devices involves the characterization of, for example, frequency associated with an occurrence type (mechanism by which hazard would be realized) given non-compliance, human exposure, operational cycles, mechanical failures, and consequences. While the disclosure herein is described variably with respect to inspection and maintenance schedules, and the preferred embodiment is with respect to inspection of elevating devices, it will become apparent to a person skilled in the art that the teachings of the invention are equally applicable to maintenance schedules, and the terms can be read interchangeably in context throughout the application. As will become apparent to a person skilled in the art from the description below, quantification of safety goals in terms of different injury severities provide a means of ranking the elevators based on their operational risk scores in a coherent way, and scheduling of their inspections in a consistent way. Based on the maximum tolerability limit, backlog criteria for devices with the missed inspections are established.

Figure 1:
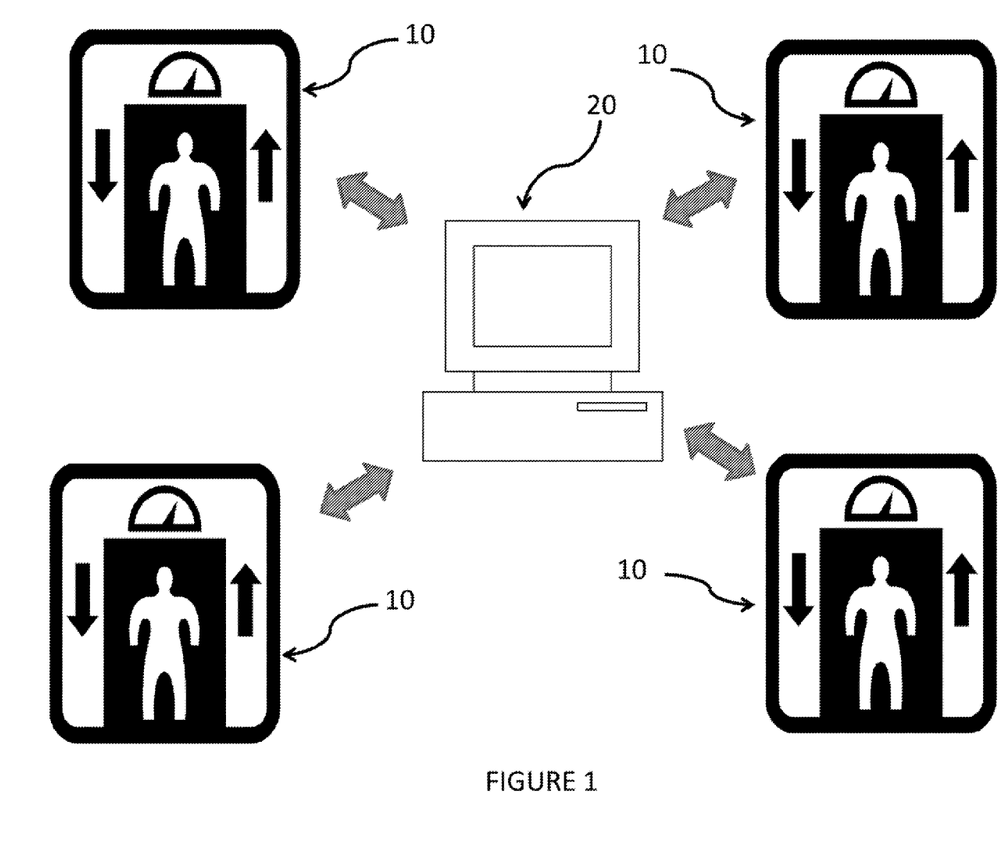
FIG. 1 is shows a top-level system according to the invention.

Referring now to FIG. 1, there is shown a general system according to the invention, including an elevator device 10 having an associated with computer system 20. In general, there will be a plurality of elevator, or other people moving devices, 10 having an associated computer system 20 from where, the invention in part is carried out. In some embodiments, various elements of the invention are located within the elevator device 10. For the purposes of the invention, computer system 20 may include a plurality of computer systems in communication with each other. Various functional modules are provided on the computer system 20 for carrying out aspects of the invention as will be discussed in more detail below.

Figure 2:
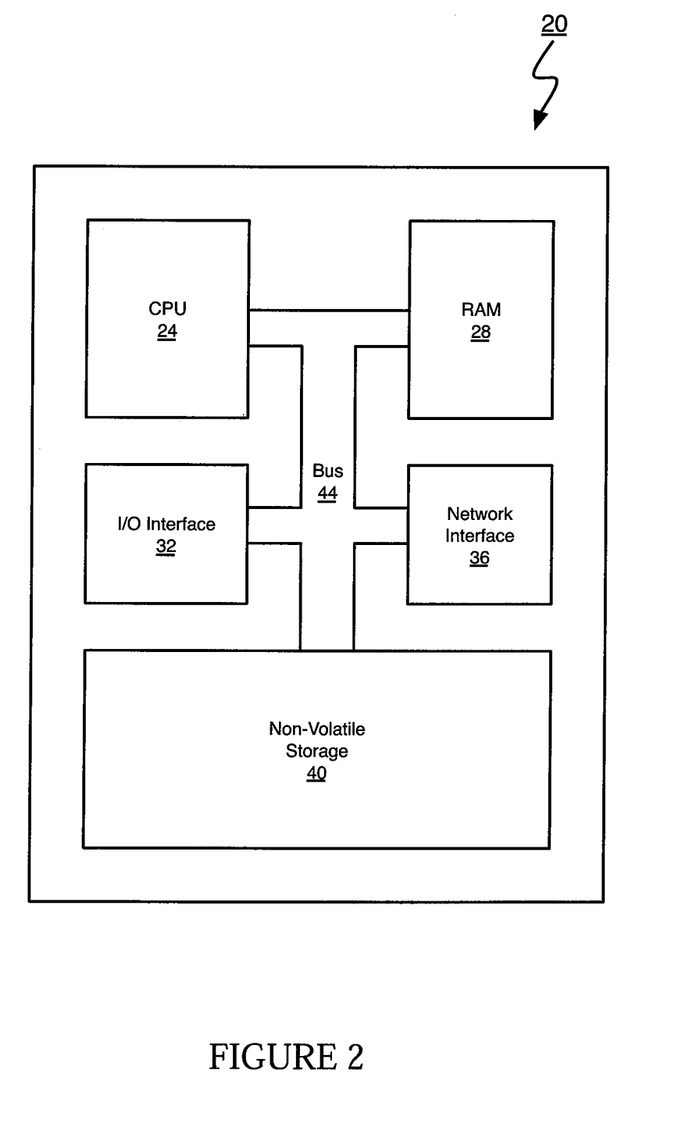
FIG. 2 shows a computer system that may be used to implement the invention.

Referring now to FIG. 2, there is shown a general computer system 20 that includes a number of physical and logical components, including a central processing unit ("CPU") 24, random access memory ("RAM") 28, an input/output ("I/O") interface 32, a network interface 36, non-volatile storage 4, and a local bus 44 enabling the CPU 24 to communicate with the other components. The CPU 24 executes an operating system, and a number of software systems and/or software modules. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other elements of the invention described herein as being in networked communication with each other. Non-volatile storage 4 stores the operating system and programs. During operation of the computer system, the operating system, the programs and the data may be retrieved from the non-volatile storage 4 and placed in RAM 28 to facilitate execution.

Figure 3:
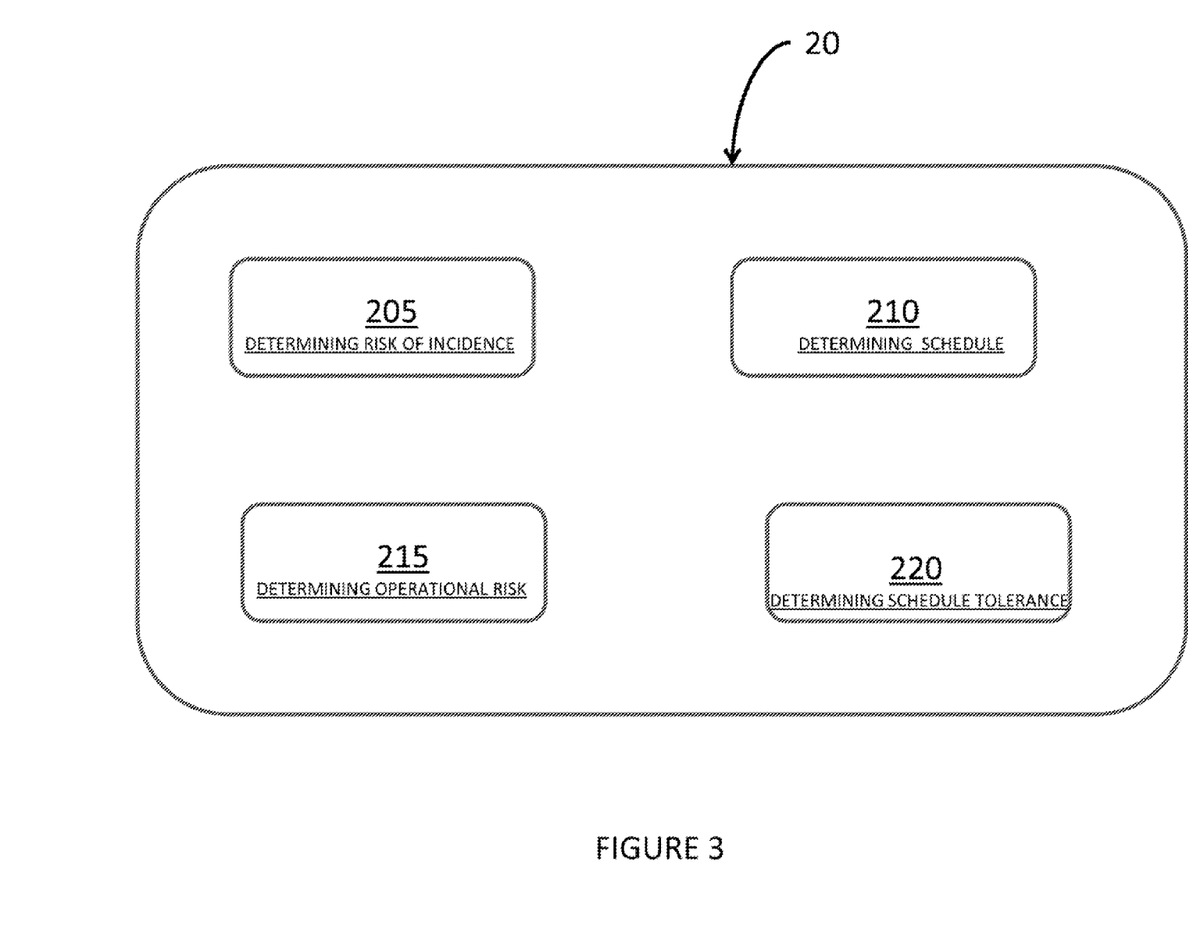
FIG. 3 shows a system according to the invention.

With reference now to FIG. 3, computer system 20 is provided for determining a risk of incidence in an elevator device and for determining an inspection schedule to mitigate the risk. Computer system 20 preferably includes a module for determining an acceptable risk score 205, a module for determining an inspection schedule based on the risk score 210, a module for determining an increase in risk score proportional to a time elapsed since an expected inspection in the inspection schedule if the expected inspection has been missed 215, a module for determining a tolerance within the inspection schedule based on the increased risk 220, and a module for specifying an inspection schedule and an inspection tolerance based on said determined schedule and said determined tolerance 225.

The module for determining an acceptable risk score 210 is programmed to select the maximum of an operational risk score and a device incident risk score to determine the acceptable risk score. The operational risk score is preferably calculated based on observed and/or measured incident occurrences of the people moving device, and the device incident risk score is calculated based on historical failure data. Thus, as will be appreciated in more detail below, both real-time calculated and/or measured risks and historically observed risks are contemplated by the invention. Since historically observed risks, and methods for setting an inspection schedule based on these risks are known in the prior art, such methods are not described in additional detail herein. Rather, the invention provides for determining and evaluating risks to set an inspection schedule based on an aggregation of operational risks as herein defined.

For the purposes of this application, and based on an observed non-compliance or measured non-compliance by way of sensors positioned on the elevating device, risk is defined as the frequency at which elevator riders may be expected to sustain a given level of injury from the realization of a hazard.

In order to express this risk, the invention defines an operational risk score calculated from equation (1):

$$RD = fb*D \qquad (1)$$

where fb is the frequency of incident occurrences per year; and, D is a measure of life years expected to be lost as a result of these occurrences by occurrence type. Alternatively, D may be a measure of operating years of the elevator expected to be lost as a result of these occurrences. In calculating D, a combination of short term effects and long term effects has been found to be most effective, to thereby model the life years lost both due to immediate incidents, and those due to long term chronic, or similar incidents.

The variable D is calculated based on equation (2):

$$D = SW*SD + FL*LW*LD \quad (2)$$

where: SW is a short-term weight, SD is a short-term duration effect measured in years, FL is a fraction representative of the long-term versus short-term effects, LW is a long-term weight, and LD is a long-term duration effect measured in years. Applicant has identified, and estimated the life years expected to be lost stemming from short and long term effects for various types of injuries, as summarized in Table 1:

TABLE 1

| Injury Type | Short-term weights (SW) | Short-term Duration (years) (LD) | Fraction Long-term effects (FL) | Long-term weights (LW) |
|---|---|---|---|---|
| Aches or pains | 0.02 | 0.0200 | 0.00 | 0.000 |
| Amputation | 0.174 | 0.0000 | 1.00 | 0.174 |
| Bruise hemorrhage | 0.2 | 0.0425 | 0.00 | 0.000 |
| Burns minor | 0.1137 | 0.0827 | 1.00 | 0.001 |
| Burns severe | 0.3622 | 0.2795 | 1.00 | 0.255 |
| Concussion | 0.354 | 0.0671 | 0.05 | 0.350 |
| Dislocation of limb | 0.0744 | 0.0200 | 0.00 | 0.000 |
| Electric shock minor | 0.04 | 0.0200 | 0.00 | 0.000 |
| Electric shock severe | 0.2 | 0.1000 | 0.10 | 0.150 |
| External bruise | 0.04 | 0.0200 | 0.00 | 0.000 |
| Eye injury | 0.3543 | 0.0192 | 0.10 | 0.298 |
| Fatal injury | 1 | 0.0000 | 1.00 | 1.000 |
| Fracture major bone | 0.20564 | 0.1000 | 0.05 | 0.100 |
| Fracture nose or | 0.08835 | 0.0699 | 0.00 | 0.000 |
| Heart attack | 0.323 | 0.1000 | 0.20 | 0.353 |
| Injury leading to | 0.22 | 0.0000 | 1.00 | 0.220 |
| Laceration deep cut | 0.19368 | 0.1000 | 0.00 | 0.000 |
| Laceration | 0.02152 | 0.0200 | 0.00 | 0.000 |
| Nausea dizziness | 0.04 | 0.0200 | 0.00 | 0.000 |
| No injury | | 0.0000 | 0.00 | 0.000 |
| Other internal injury | 0.208 | 0.0425 | 0.00 | 0.000 |
| Poisoning | 0.611 | 0.0082 | 0.00 | 0.000 |
| Respiratory infection | 0.07 | 0.0200 | 0.00 | 0.000 |
| Seizure | 0.15 | 0.1000 | 0.00 | 0.000 |

TABLE 1-continued

| Injury Type | Short-term weights (SW) | Short-term Duration (years) (LD) | Fraction Long-term effects (FL) | Long-term weights (LW) |
|---|---|---|---|---|
| Skin infection | 0.07 | 0.0200 | 0.00 | 0.000 |
| Spinal injury | 0.725 | 0.0000 | 1.00 | 0.725 |
| Sprained or twisted | 0.064 | 0.0384 | 0.00 | 0.000 |
| Swelling | 0.04 | 0.0200 | 0.00 | 0.000 |
| Undue exposure to | 0.15 | 0.1000 | 0.00 | 0.000 |
| Whiplash | 0.04 | 0.0200 | 0.05 | 0.04 |

The long term duration variable, LD, in equation (2) represents the expected term of life that would be left if the injury or incident had not occurred. For example, as shown in FIG. 2, different age groups have a different remaining life expectancy:

TABLE 2

| | Life Expectancy | | |
|---|---|---|---|
| Age Group | Male | Female | Average |
| 0-14 | 73.09 | 76.42 | 74.755 |
| 15-24 | 58.4 | 61.8 | 60.1 |
| 25-44 | 42.7 | 46.17 | 44.435 |
| 45-64 | 22.8 | 26.55 | 24.675 |
| 65+ | 8.54 | 10.38 | 9.46 |

Analogously, this data may be applied to mechanical and/or electrical components in an elevating device, where the injury type could represent a particular type of mechanical and/or electrical incident with corresponding long term and short term durations and weights. An equivalent to table 2 would also be created to identify the remaining life expectancy for particular mechanical and/or electrical components if the incident had not occurred. Such mechanical and/or electrical life expectancies are generally known in the art, however, their application to the description of the invention is thought to be novel. Another way of approaching this issue is to consider the types of injuries that result from various reported elevator incidents. Table 3 shows the results the expected risks to users and their relative severity based on research undertaken by the applicant. Correlating the incident types with the effects on human life as per Table 2 may also be used to determine the values of D in equation (2) and ultimately a risk score from equation (1).

TABLE 3

| Occurrence Type | Description | Fatality | Serious Injury | Minor Injury | No Injury |
|---|---|---|---|---|---|
| Alarm bell inoperative | this could lead to longer periods of entrapment causing physical/mental discomfort | 0.05% | 1% | 15% | 84% |
| Deficiencies not directly resulting in health impact | will not receive separate likelihood and consequence directly but will be dealt with through actual observed deficiencies | 0% | 0% | 0% | 100% |
| Door closing force too high (entrapped between doors) | caught between doors | 0% | 5% | 20% | 75% |
| Door closing speed too high | struck by doors | 1% | 5% | 34% | 60% |
| Door reopening device inoperative | struck and/or caught by doors | 0% | 1% | 34% | 65% |
| Door separation | hall door closing with car door open or vice versa could lead trip, falls etc. | 0% | 1% | 20% | 79% |
| Electric shock | could lead to burns, tingling, tickling | 0.05% | 0.95% | 89% | 10% |

TABLE 3-continued

| Occurrence Type | Description | Fatality | Serious Injury | Minor Injury | No Injury |
|---|---|---|---|---|---|
| Elevator moving with door open | uncontrolled movement (e.g. drifting) may lead to slip, trip or falling into pit, or struck by car header or car floor, entrapment | 1% | 10% | 30% | 59% |
| Elevator running with door open | running at rated speed | 5% | 35% | 15% | 45% |
| Sudden stop (due to safety buffer) -->all device types except escalator | could cause cuts, bruises, physical discomfort etc | 0% | 5% | 20% | 75% |
| Entrapment between hoistway and platform | cuts, bruises, shearing, crushing etc. | 10% | 70% | 20% | 0% |
| Entrapment between lift and surrounding area (Unenclosed Vert. Plat. Lift) | cuts, bruises, shearing, crushing etc. | 0% | 2% | 90% | 8% |
| Entrapment between step and comb plate | cuts, bruises, severence etc | 0.05% | 5% | 80% | 14.95% |
| Entrapment between step and skirt | cuts, bruises, severence etc | 0% | 8% | 70% | 22% |
| Entrapment between steps | cuts, bruises, severence etc | 0% | 1% | 30% | 69% |
| Escalator sudden stop | could cause slips, trips, and falls | 0.05% | 19.95% | 30% | 50% |
| Exposed hoistway | | 1% | 5% | 3% | 91% |
| Exposed wellway | | 1% | 10% | 4% | 85% |
| Falling object in door way | doors are open someone walking in is hit by loose objects | 1% | 5% | 40% | 54% |
| Falling object in path of lift | could cause cuts, bruises, physical discomfort etc | 0% | 1% | 2% | 97% |
| Falling object on beltway (manlift) | rider hit by falling objects | 1% | 5% | 40% | 54% |
| Falling objects in the car | cuts, bruises, head injuries, severence etc. | 0% | 1% | 40% | 59% |
| Fire elevator | burns, smoke inhalation | 1% | 2% | 30% | 67% |
| Fire escalator | burns, smoke inhalation | 0% | 1% | 5% | 94% |
| Fire manlift | burns, smoke inhalation | 1% | 1% | 20% | 78% |
| Fire construction hoist | burns, smoke inhalation | 1% | 1% | 20% | 78% |
| Fire unenclosed vert. Plat. Lift | burns, smoke inhalation | 0% | 1% | 5% | 94% |
| General regulatory requirements | will not receive separate likelihood and consequence directly but will be dealt with through actual observed deficiencies | 0% | 0% | 0% | 100% |
| Hazards to inspector/mechanic | these could result when public do not have access but mechanic or inspector may be exposed | 0.05% | 9.95% | 40% | 50% |
| Hoist moving with door open | uncontrolled movement (e.g. drifting) may lead to slip, trip or falling into pit, or struck by car header or car floor, entrapment | 0.05% | 9.95% | 20% | 70% |
| Hoist running with door open | running at rated speed | 1% | 25% | 10% | 64% |
| Hoist striking building parts or other object | could result in serious injuries or fatality | 0.05% | 9.95% | 30% | 60% |
| Improper handrail speed | could cause falls | 0% | 0% | 5% | 95% |
| Inadequate lighting | cuts, bruises, and head injuries | 0% | 4% | 6% | 90% |
| Lift sudden stop (Unenclosed Vertical Platform Lift) | could cause cuts, bruises, physical discomfort etc | 0% | 0% | 0% | 100% |
| Out of level | could lead to trip or fall | 0% | 5% | 20% | 75% |
| Overspeed ascent | cuts, bruises, head injuries, etc. | 0.05% | 24.95% | 60% | 15% |
| Overspeed descent | cuts, bruises, head injuries, etc. | 0.05% | 24.95% | 60% | 15% |
| Part falling off hoist | could result in serious injuries or fatality | 1% | 10% | 30% | 59% |
| Rider did not disembark at terminal landing (Manlift) | could cause cuts, bruises, physical discomfort etc | 0% | 0% | 1% | 99% |
| Rider falling off belt | could lead to serious injury or fatality | 1% | 30% | 40% | 29% |

TABLE 3-continued

| Occurrence Type | Description | Fatality | Serious Injury | Minor Injury | No Injury |
|---|---|---|---|---|---|
| Rider struck object at floor opening (Manlift) | could cause cuts, bruises, physical discomfort etc | 0% | 5% | 25% | 70% |
| Sharp edges | could lead to cuts, bruises, severence etc. | 0% | 5% | 90% | 5% |
| Shearing/pinching | finger caught b/w door jam; finger caught in gate or b/w gate and post; finger caught in equipment | 0% | 0% | 90% | 10% |
| Two way communication inoperative | this could lead to longer periods of entrapment causing physical/mental discomfort | 0.05% | 1% | 15% | 84% |

The examples, and data discussed and shown with respect to the tables above are not to be considered all-encompassing or limiting on the invention, and are merely illustrative to allow a person skilled in the art to put the invention into practice. Rather, the invention discloses a method and system that may use the data presented in the tables above as inputs in the preferred embodiments, but the method and system of the invention are not restricted or limited to the use of such data.

Figure 7:
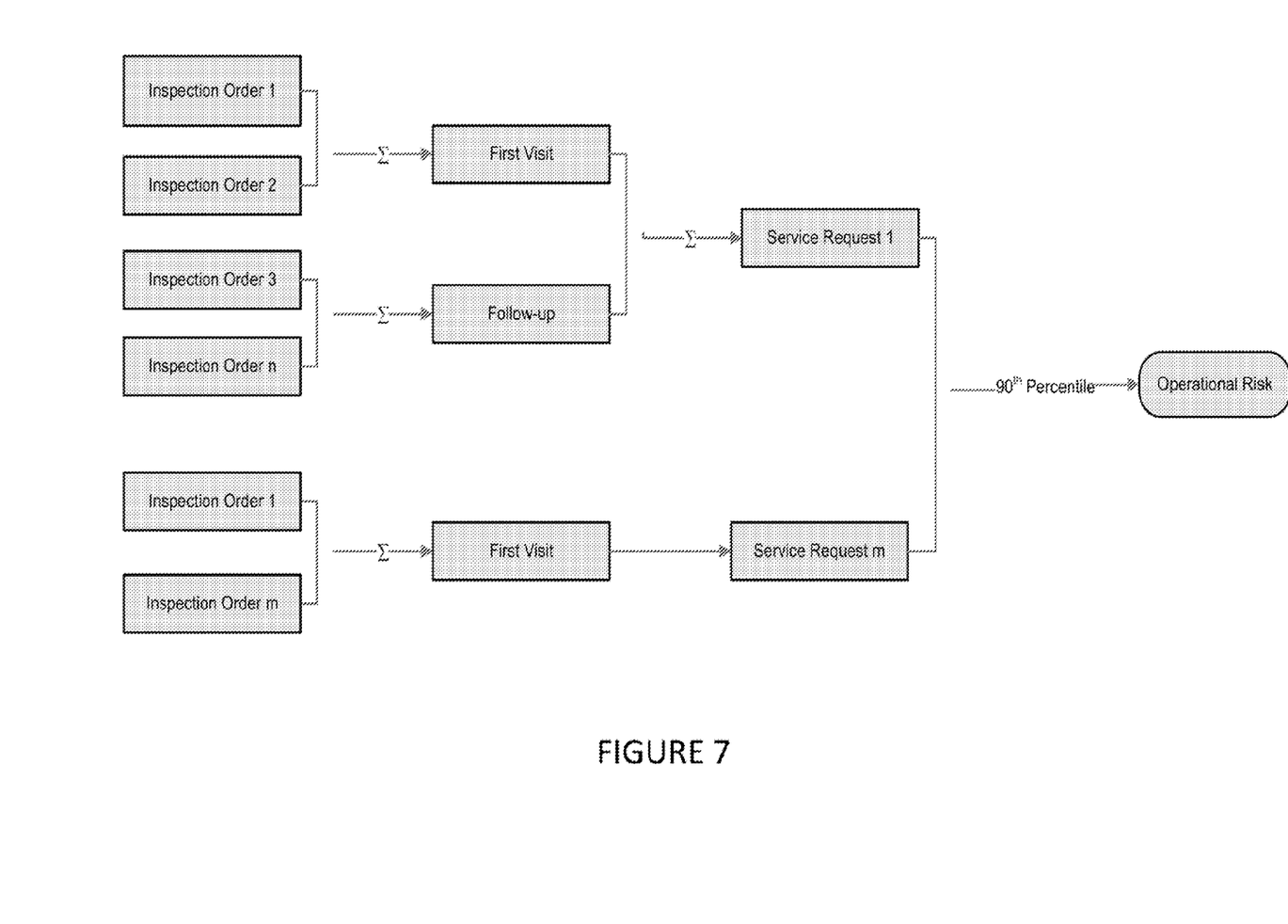
FIG. 7 illustrates risk aggregation according to the invention.

Each type of incident will be accumulate risk, and in this manner, the invention also distinguishes over prior art system and methods which treated each of type of potential risk independently of each other one with regards to maintenance and inspections. Accordingly, the module for determining an acceptable risk score 210 preferably also calculates an overall operational device risk score as the summation of each incident risk score as determined from equation (1). As shown in FIG. 7, according to a preferred embodiment, and in situations where there are a large number of incidents accumulating risk, the invention considers the use of only aggregating the $90^{th}$ percentile of risks towards the operational device risk score. In this manner, incidents that contribute relative small amounts (ie. the $10^{th}$ percentile of scores) to the aggregate risk score are not included in the calculation. This allows for a large number of inspection orders to be carried out, and incidents documented without concern that truly insignificant incidents will be recorded and applied in aggregate to a device operational risk score.

The invention thus provides the ability to trigger an inspection or maintenance call when there are sufficient numbers of risks that when taken independently of each other would seem insignificant. Furthermore, the elevator device may thus be classified as either high risk device, a medium risk device, or a low risk device based on the aggregate operational risk score. Scheduling of inspections may then be accomplished so that elevators with a higher number of incidents, irrespective of their severity, or elevators with fewer but more severe incidents may have inspections scheduled with a higher urgency. Thus, the invention captures such aggregate risks that have heretofore been ignored, or otherwise fallen below the radar, in prior art methods and systems.

According to one example, if an elevator device is characterized as a high risk device, it is immediately identified for an inspection, or alternatively, for a maintenance order. Elevating devices characterized as high risk devices are, beyond this point, not treated according to the invention, as they are immediately subjected to an inspection order. It is generally accepted in the art that if there is an expectation of one fatality over a 6-month operational period, then an elevator is considered a high risk elevator and should be inspected immediately for hazardous risks.

Using the one fatality over a 6-month period as a basis, equation (2) can be solved to result in a value of $4.5\times10^{-4}$. Accordingly, where a value of D is obtained greater than this figure, the elevator is characterized as a high risk elevator and is immediately scheduled for inspection. If the expected fatality risk is less than on fatality over a 6 month period and equal to or greater than serious injury over a 12 month period then the elevator can be characterized a medium risk device. This is one where the value of D from equation (2) is between $4.5\times10^{-4}$ and $6.7\times10^{-6}$. A low risk elevator in when there is an expectation of injury is less than one serious injury over a 12 month period but greater than a minor injury over an 18 month operational period. Low risk elevators will result in a value of D from equation (2) of between $6.7\times10^{-6}$ and $4.71\times10^{-9}$. Values of D lower than $4.71\times10^{-9}$ are considered safe—that is, there is an expectation of injury of less than one minor injury over an 18 month operational period. These elevators may be inspected according to prior art methods, or on a schedule dictated by a regulating body. The invention focuses on those elevators identified as medium and low risk elevators, and the scheduling of inspections and/or maintenance with respect thereto. High risk elevators may be identified according to the method and system described herein, but a high risk indication requires immediate action and therefore will not benefit from the scheduling capabilities of the invention as described below. Similarly, low risk elevators have no, or only negligible, identified risks and accordingly cannot be modeled in accordance with the teachings of the invention.

Next, the system according to the invention, includes the module for determining an inspection schedule 210 calculates an inspection schedule having inputs into the calculation stemming from the risk score as described above. Applicants have discovered that the inspection schedule is best modeled separately for medium and low risk devices, since each is defined in terms of the number of injuries expected per different time units.

Figure 4:
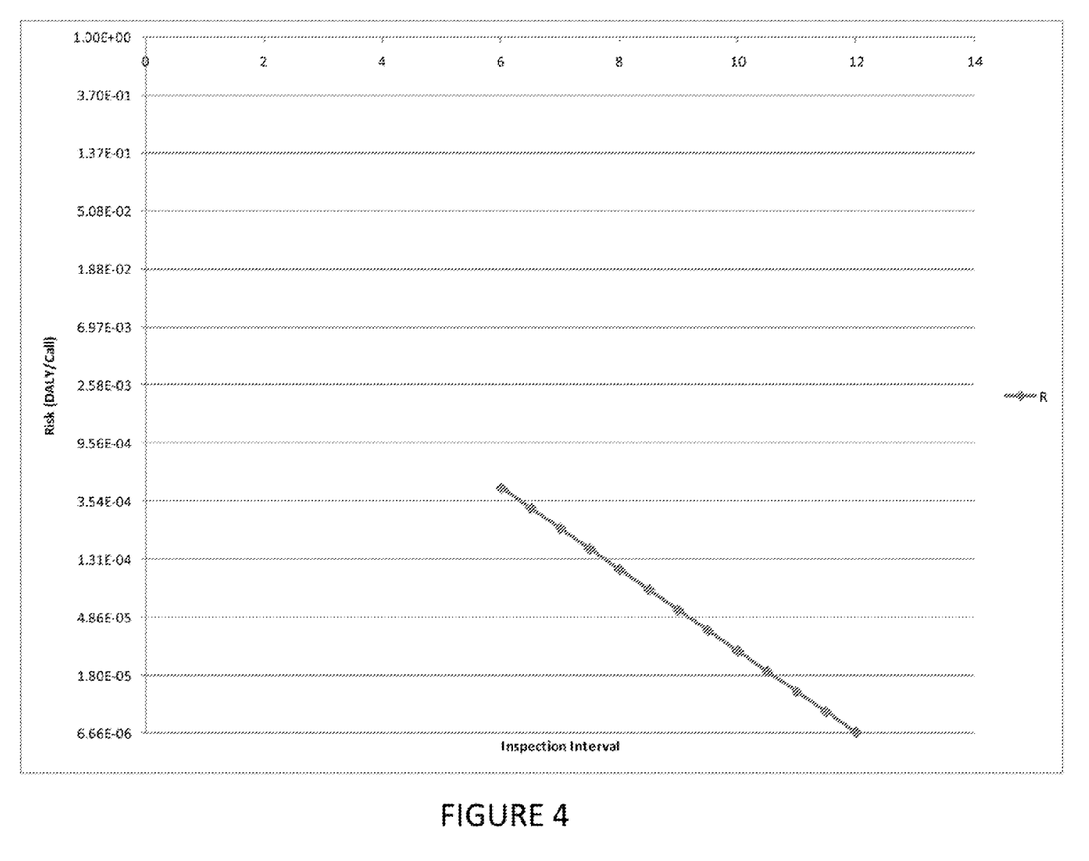
FIG. 4 illustrates the relationship between inspection intervals and risk score as calculated according to the invention.

Let's start with the development of a functional equation that governs the medium risk devices. In this regime the inspection interval range from 6 to 12 months. For a monotonically decreasing inspection interval a monotonically increasing risk value is modeled by using the exponential function. In the face of model uncertainty, the scientific selection of the mathematical function is based on the fact that; it fulfills the requirements of the boundary conditions and ranks the elevating devices coherently, and achieves the safety goals in a consistent manner. The function is a good fit for the risk score distribution, as shown in FIG. 4. Equation (3) shows this function for medium risk devices:

$$R_M = 6.7\times10^{-6} \exp[0.7(12-t_m)] \quad (3)$$

where $t_M \in [6, 12]$ months.

Accordingly, for known operational risk scores as calculated above, the inspection interval in months is shown in equation (4):

$$t_M = 12 - \frac{1}{0.7} LN\left[\frac{R_M}{6.7 \times 10^{-6}}\right] \quad (4)$$

where $R_M \epsilon [4.5 \times 10^{-4}, 6.7 \times 10^{-9}]$D/call

Similarly, the governing equation for low risk devices is shown in equation (5):

$$R_L = 4.713 \times 10^{-9} \exp[1.21(18-t_L)] \quad (5)$$

where $t_L \epsilon [12, 18]$months.

Accordingly, for known operational risk scores as calculated above, the inspection interval in months for low risk devices is shown in equation (6):

$$t_L = 18 - \frac{1}{1.21} LN\left[\frac{R_L}{4.713 \times 10^{-9}}\right] \quad (6)$$

where $R_L \epsilon [6.7 \times 10^{-6}, 4.713 \times 10^{-9}]$D/call

Once an inspection schedule has been determined, the module for determining an increase in risk score calculates an increased risk score $R_M$ or $R_L$, respectively for medium and low risk devices. The invention provides that if a device has missed its inspection date then it starts accumulating real-time operational risk. Equations (3) to (6) are not capable of modeling the incremental risk values due to elapsed time since the last missed inspection date. Whence a device does not get inspected on or before the due inspection date, then its predicted risk increases with the elapsed time since the missed inspection date. The challenge is: how to model this? One way of doing it is that a person thinks of an imaginary source that start contributing to the risk when a device is not inspected on its due date. This imaginary source is introduced through a simple reflection scheme. This can be best described by the following example:

Assuming a device was on the 8-month inspection cycle (in this example, the calculated value of 8 months is derived from equation 4 for a calculated operational risk of $1.1 \times 10^{-4}$), and the device is not inspected till the $9^{th}$ month (i.e. overdue inspection time is one month). Assuming the overdue month has contributed the amount of risk $\Delta R_s$, then the total risk for a device at any overdue inspection time, $R_{S+od}^*$, is $$R_{S+od}^* = \Delta R_S + R_S = R_{S-od}$$

where, $R_S$ is operational risk corresponding to the scheduled inspection interval; and $R_{S-od}$ is operational risk corresponding to the time interval which is a difference between the scheduled interval and the overdue interval (in this example it is operational risk corresponding to: 8−1=7 months).

In the given example, Equation (7) can be written as:

$$R_{8+1}^* = R_{8-1}$$

or $$R_{8-1}^* = R_7$$

Figure 6:
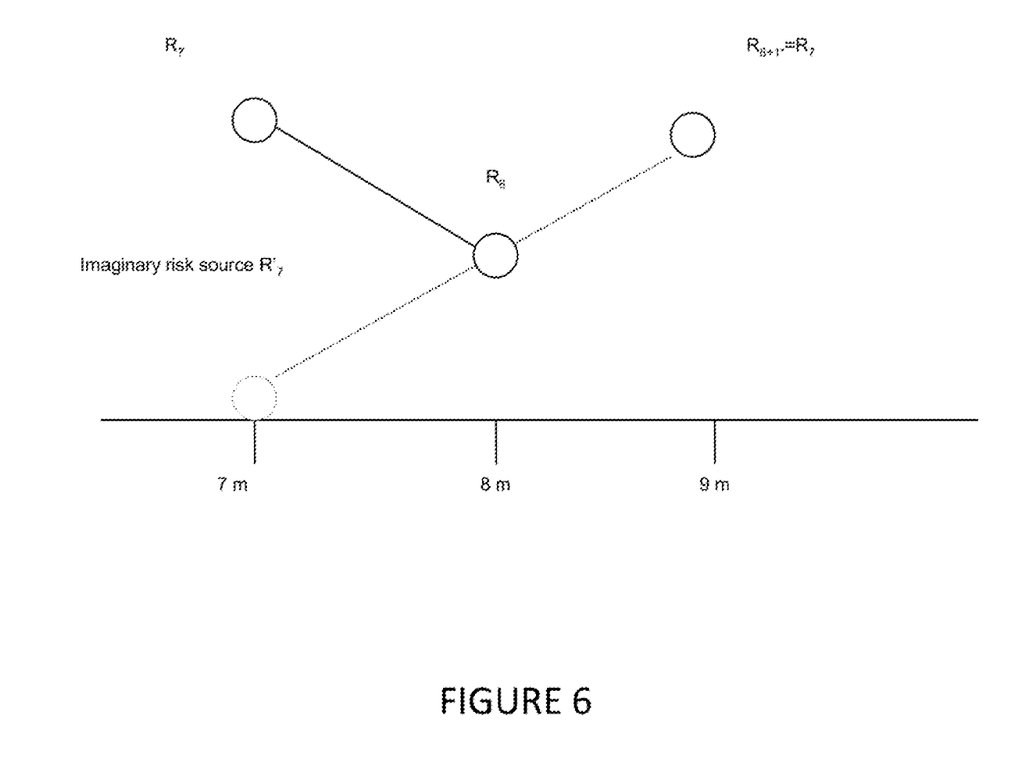
FIG. 6 illustrates the modeling of accumulation of risk scores after a missed inspection according to the invention.

This formation holds if we accept a perfect reflection of risk by placing an imaginary mirror at the due inspection time (i.e., 100% reflection, see FIG. 6).

Based on this discussion Equation 3 can be revised as:

$$R_M = 6.7 \times 10^{-6} \exp[0.7(12-(t_M-od))] \quad (7)$$

Where od=overdue inspection time (in the above example it is 9−8=1 month).

Due to this reflection scheme we can say that risk starts accumulating once an elevator past its inspection due date and risk accumulates to a point that it reaches to a max tolerability. At this point we can say a device is in "backlog" or potentially poses a higher risk. The risk value of $4.5 \times 10^{-4}$ Ds/Call is used as a tolerability limit. By using this information and Equation 7, a generalized tolerability equation for the Medium risk regime can be given as:

$$12 - [t_M - od]/6 \quad (8)$$

By considering the strict equality in the above equation we can define the max tolerable $od_{T_{max}}$ time for the inspection interval $t_M \epsilon [6, 12]$months as $$od_{T_{max}} = t_M - 6 \quad (9)$$

This relationship is shown graphically in FIG. 4. The relationship between the max tolerable overdue time and inspection interval is linearly proportional: the higher the inspection interval the more tolerability in terms of overdue time period.

Similarly, for low risk devices:

$$18 - [t_L - od] \leq 12$$

By using the equality sign in the above equation we can define the $od_{T_{max}}$ for the inspection interval $t_L \epsilon [12, 18]$months as $$od_{T_{max}} = t_L - 6 \quad (10)$$

Assuming $t_L = 18$, as an example, then Equation (10) says that the max tolerable overdue time is 12 months. This means that under the assumption of this reflection scheme if a device with 18 months inspection interval goes uninspected for another 12 months then at the $30^{th}$ month the device will be having a risk score corresponding to $4.5 \times 10^{-4}$ Ds/Call.

Now for the safe bin devices there is another constraint which requires the inspection of a device at least once in 36 months regardless its risk score approaches to zero. The minimum operator is used to quantify the $od_{T_{max}}$ by using the following two Equations:

$$\text{Min}[od_{T_{max}} = t_S - 6, od_{T_{max}} = 36 - t_s] \quad (11)$$

At $t_s = 21$ months both equations give the same value of $od_{T_{max}} = 15$. Before this break even inspection interval of 21 months, the reflection scheme governs, and after it, the constraint related to 1 inspection in 36 months governs the $od_{T_{max}}$ value for the safe regime.

Accordingly, it can be seen that the invention provides for a tolerance within which inspections are to occur and provides a technical, computer-implemented and quantitative solution to a long felt need in the art. Applicant submits that applicant's system provides a novel approach to evaluating risk in elevating devices, for determining real-time aggregate operational risk as described, and for initiating inspections and/or maintenance based on the quantified risk. Furthermore, it is contemplated that inputs into the equations above may be derived directly from measurement devices or sensors position on mechanical components of the elevating devices. Certain examples of putting the invention into practice are provided further below. From the system described above, a detailed inspection and/or maintenance schedule may be determined that includes adaptations for missed or late inspections that have heretofore not been available in the prior art.

Figure 5:
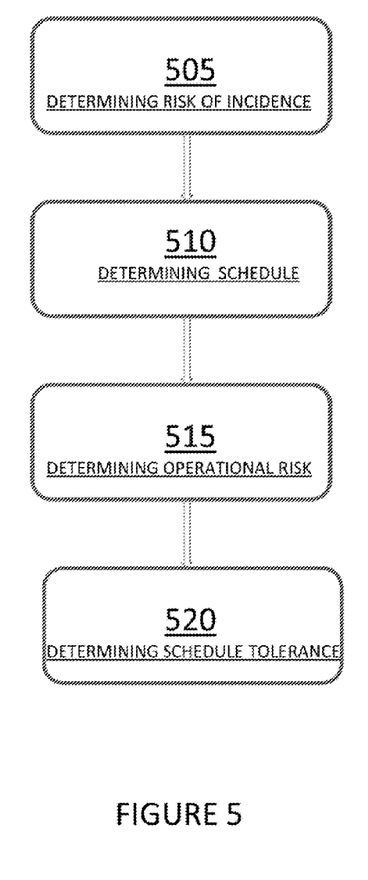
FIG. 5 is a flowchart showing a method according to the invention.

According to other embodiments of the invention, and with reference to FIG. 5, the invention includes a method for determining a risk of failure in a people moving device and for determining an inspection schedule to mitigate said risk. The method preferably includes the steps of determining an acceptable risk score 505, determining an inspection schedule based on the risk score 510, determining an increase in risk score proportional to a time elapsed since an expected inspection in the inspection schedule if the expected inspection has been missed 515, determining a tolerance within the inspection schedule based on the increased risk 520, and specifying an inspection schedule and an inspection tolerance based on the determined schedule and the determined tolerance. The method herein described may be implemented with the system described above.

The method may further include the step of determining an acceptable risk score 525 by selecting the maximum of an operational risk score, and a device incident risk score. Preferably, the operational risk score is calculated based on observed and/or measured incident occurrences of the people moving device, and the device incident risk score is calculated based on historical failure data. That is, where historical incident data exists, it will be the overriding factor in determining a high risk device.

The calculation of risk scores, and the associated scheduling of inspections and/or maintenance along with the calculation and adaptation of tolerances on the scheduling of inspections and/or maintenance is carried out in accordance with the teachings of the system described above.

According to yet another embodiment of the invention, applicants contemplate an elevator device for a building having an associated computer system in communication therewith for carrying out various aspects of the invention as described above. According to this embodiment, the elevator itself, or mechanical/electrical components associated therewith may be provided with sensors or other measuring means that communicate information regarding the expected remaining life of various components to the computer system described above. Accordingly, an inspection and/or maintenance schedule may be provided in response to information derived from these sensors or other measuring means and having been processed by the system of the invention as herein described.

EXAMPLE 1

An elevator having been inspected following different incident reports in the previous three years relating to each of (1) the elevator stopping between floors and (2) a failure of the sensors that ensure that doors do not close when users are in the doorway. It is known that these two incidents pose a risk of (1) a sprained ankle from a user tripping upon exiting the elevator when the elevator does not stop at an appropriate level with respect to the floor, and (2) a risk of aches or pains caused by the door closing on a user. Furthermore, since the elevator is in a university building housing students between the ages of 15-24, it is known from Table 2 that the average life expectancy of the user's of the elevator from their current age is 60.1 years.

Accordingly, from equation (2) above and with reference to Tables (1) and (2), a calculation of the number of life years expected to be lost as a result of each of these occurrences as:

| D(1) | D(2) |
|------|------|
| .0025 | .0004 |

This leads to a calculation of an operational risk score, from equation (1), based on 1 incidence every three years, and summed up for each of D(1) and D(2) of R=0.00097. These results in the classification of the elevator device as a medium risk elevator.

Accordingly, from equation (4) above, the inspection interval in months is determined to be 4.9 months.

Assuming the inspection date is missed, and the 6 month date from a previous inspection arrives, the inspection is now 1.1 months overdue, and 1.1 months worth of additional risk has been accumulated. A new risk score at the 6 month date can be calculated from equation (7), and so long as the score does not enter the range of a high risk device, the delayed inspection is still within the acceptable tolerance.

EXAMPLE 2

An elevator has been inspected following alert notices automatically generated by sensors adapted to report on the structural integrity of the cables used to move the elevator between floors. The cables used in the elevator have an expected life span of 150 years under normal operation, however, due to excessive debris in the elevator shaft coming into contact with the cables, a weakening point has been sensed. It is determined that for such cables, from equation (2), the value of SW is 0.0048, SD is 0.0069, FL is 0.0009 and LW is 0.0030. The remaining life of the cables, LD is 12 years.

Accordingly, from equation (2), the value of D is calculated to be $6.6 \times 10^{-5}$. This leads to a calculation of an operational risk score, from equation (1), based on 1 incident this year of $R=6.6 \times 10^{-5}$. These results in the classification of the elevator device as a medium risk elevator.

Accordingly, from equation (4) above, the inspection interval in months is determined to be 8.7 months.

Assuming the inspection date is missed, and the 10 month date from a previous inspection arrives, the inspection is now 1.3 months overdue, and 1.3 months worth of additional risk has been accumulated. A new risk score at the 10 month date is calculated from equation (7) as, and so long as the score does not enter the range of a high risk device, the delayed inspection is still within the acceptable tolerance.

The above-described embodiments are intended to be examples of the present invention and alterations and modifications may be effected thereto, by those of skill in the art, without departing from the scope of the invention that is defined solely by the claims appended hereto. While the invention has been described with respect to elevators and similar people moving devices, for clarity, applicant notes that elevating and similar people moving devices include devices capable of moving groups of people in public places that are subject to the periodic maintenance and inspection regimes described above. Elevator and similar people moving devices include, but are not limited to, elevators, escalators, horizontal people movers, amusement park rides such a rollercoaster, and ramp-type lifts for wheelchair users.

Other modifications to and variations of the invention are also contemplated, for example, the computer system herein described may be provided integrally with the elevator and adapted to communicate wireless or via the internet to inspection and/or maintenance operators. In this case, the elevator and the computer system take the form of a single unit. In this variation, it is contemplated that an inspector may have access to the computer system at the site of the elevator and can directly input the results of an inspection into the onsite computer, thereby generating future inspection and/or maintenance schedules on-site, in accordance with the teachings of the invention.

What is claimed is:

1. A method for determining a risk of failure in a people moving device and for determining an inspection interval to mitigate said risk; the method comprising:

determining by a computer system an acceptable risk score based on computer readable instructions provided on a non-transitory computer readable medium;

determining by said computer system an inspection interval based on said risk score;

determining by said computer system an increase in risk score proportional to a time elapsed since a missed inspection in said inspection interval;

determining by said computer system a tolerance within said inspection interval based on said increased risk score; and, specifying by said computer system an inspection interval and an inspection tolerance based on said determined schedule and said determined tolerance;

wherein said step of determining an inspection interval comprises calculating the inspection interval $t_m$ or $t_L$ based on equations (3) and (4) for medium and low risk devices, respectively:

$$t_M = 12 - \frac{1}{0.7}LN\left[\frac{R_M}{6.7 \times 10^{-6}}\right] \quad (3)$$

$$t_L = 18 - \frac{1}{1.21}LN\left[\frac{R_L}{4.713 \times 10^{-9}}\right] \quad (4)$$

where $t_M$ and $t_L$ are measured in months, and $R_M$ and $R_L$ are acceptable risk scores;

and wherein said step of determining an increase in risk score comprises calculating an increased risk score $R_{M2}$ or $R_{L2}$ based on equations (5) and (6) for medium and low risk devices, respectively:

$$R_{M2} = 6.7 \times 10^{-6} \exp[0.7(12 - (t_M - od))] \quad (5)$$

$$R_{L2} = 2.4 \times 10^{-6} \exp[1.322(18 - (t_L - od))] \quad (6)$$

where od is the time elapsed since said missed inspection.

2. A method according to claim 1, wherein said step of determining an acceptable risk score comprises selecting the maximum of
   i. an operational risk score; and,
   ii. a device incident risk score;
wherein said operational risk score is calculated based on observed and/or measured incident occurrences of said people moving device, and wherein said device incident risk score is calculated based on historical failure data.

3. A method according to claim 2, wherein said operational risk score is calculated based on the equation (1):

$$R_D = f_b * D \quad (1)$$

where $f_b$ is the frequency of incident occurrences per year; and,

D is a measure of life years expected to be lost as a result of said occurrences by occurrence type, and is calculated based on equation (2):

$$D = SW*SD + FL*LW*LD \quad (2)$$

where:
SW is a short-term weight,
SD is a short-term duration effect measured in years,
FL is a fraction representative of the long-term versus short-term effects,
LW is a long-term weight, and
LD is a long-term duration effect measured in years.

4. A method according to claim 3, wherein a device operational risk score is a summation of each said operational risk score calculated based on equation (1) for each type of incident.

5. A method according to claim 4, wherein said people moving device is identified as one of a high risk device, a medium risk device and a low risk device.

6. A method according to claim 5, wherein said high risk device is one where the value of D from equation (2) is equal to or greater than $4.5 \times 10^{-4}$; said medium risk device is one where the value of D from equation (2) is between $4.5 \times 10^{-4}$ and $6.7 \times 10^{-6}$ and said low risk device is one where the value of D from equation (2) is less than $6.7 \times 10^{-6}$.

7. A method according to claim 6, further comprising the step of initiating an inspection of said people moving device if said people moving device is identified as a high risk device.

8. A method according to claim 1, further including the step of using said increased risk score to determine if said increased risk is a high, medium or low risk; wherein said tolerance is defined as the time od in either of equations (5) or (6) that results in said risk score being indicative of a high risk.

9. A method according to claim 1, wherein said people moving device comprises an elevator.

10. A system for determining a risk of failure in a people moving device and for determining an inspection interval to mitigate said risk; the system comprising:

a computer system including a processor and a server;

a module executed by said computer system for determining an acceptable risk score;

a module executed by said computer system for determining an inspection interval based on said risk score;

a module executed by said computer system for determining an increase in risk score proportional to a time elapsed since an expected inspection in said inspection interval if said expected inspection has been missed;

a module executed by said computer system for determining a tolerance within said inspection interval based on said increased risk score; and, a module executed by said computer system for specifying an inspection interval and an inspection tolerance based on said determined schedule and said determined tolerance;

each said module provided on a non-transitory computer readable medium;

wherein said determining an inspection interval comprises calculating the inspection interval $t_m$ or $t_l$ based on equations (3) and (4) for medium and low risk devices, respectively:

$$t_M = 12 - \frac{1}{0.7}LN\left[\frac{R_M}{6.7 \times 10^{-6}}\right] \quad (3)$$

$$t_L = 18 - \frac{1}{1.21}LN\left[\frac{R_L}{4.713 \times 10^{-9}}\right] \quad (4)$$

where $t_M$ and $t_L$ are measured in months and $R_M$ and $R_L$ are acceptable risk scores;

and wherein of determining an increase in risk score comprises calculating an increased risk score $R_{M2}$ or $R_{L2}$ based on equations (5) and (6) for medium and low risk devices, respectively:

$$R_{M2} = 6.7 \times 10^{-6} \exp[0.7(12 - (t_M - od))] \qquad (5)$$

$$R_{L2} = 2.4 \times 10^{-6} \exp[1.322(18 - (t_L - od))] \qquad (6)$$

where od is the time elapsed since said missed inspection.

11. A system according to claim 10, wherein said module for determining an acceptable risk score selects the maximum of
   i. an operational risk score; and,
   ii. a device incident risk score;
to determine said acceptable risk score; wherein said operational risk score is calculated based on observed and/or measured incident occurrences of said people moving device, and wherein said device incident risk score is calculated based on historical failure data.

12. A system according to claim 11, wherein said operational risk score is calculated based on the equation (1):

$$R_D = f_b * D \qquad (1)$$

where $f_b$ is the frequency of incident occurrences per year; and,

D is a measure of life years expected to be lost as a result of said occurrences by occurrence type, and is calculated based on equation (2):

$$D = SW*SD + FL*LW*LD \qquad (2)$$

where:
SW is a short-term weight,
SD is a short-term duration effect measured in years,
FL is a fraction representative of the long-term versus short-term effects,
LW is a long-term weight, and
LD is a long-term duration effect measured in years.

13. A system according to claim 12, wherein said module for determining an acceptable risk score further calculates a device operational risk score as a summation of each said operational risk score calculated based on equation (1) for each type of incident.

14. A system according to claim 13, wherein one of said module for determining an acceptable risk score and said module for determining an inspection schedule based on said risk score identifies said people moving device as one of a high risk device, a medium risk device and a low risk device.

15. A system according to claim 14, wherein said high risk device is one where the value of D from equation (2) is equal to or greater than $4.5 \times 10^{-4}$; said medium risk device is one where the value of D from equation (2) is between $4.5 \times 10^{-4}$ and $6.7 \times 10^{-6}$ and said low risk device is one where the value of D from equation (2) is less than $6.7 \times 10^{-6}$.

16. A system according to claim 10, further including a module for using said increased risk score to determine if said increased risk is a high, medium or low risk; wherein said tolerance is defined as the time od in either of equations (5) or (6) that results in said risk score being indicative of a high risk.

17. A system according to claim 10, wherein said people moving device comprises an elevator.

18. A non-transitory computer readable medium having computer executable instructions thereon for carrying out the method according to claim 1.

* * * * *